(12) United States Patent
Hoenicke

(10) Patent No.: US 8,902,892 B2
(45) Date of Patent: Dec. 2, 2014

(54) COLLECTIVE NETWORK ROUTING

(75) Inventor: Dirk Hoenicke, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 560 days.

(21) Appl. No.: 12/173,073

(22) Filed: Jul. 15, 2008

(65) Prior Publication Data

US 2008/0298368 A1   Dec. 4, 2008

Related U.S. Application Data

(63) Continuation of application No. 11/100,207, filed on Apr. 6, 2005, now abandoned.

(60) Provisional application No. 60/625,026, filed on Nov. 4, 2004.

(51) Int. Cl.
| | |
|---|---|
| *H04L 12/28* | (2006.01) |
| *H04L 12/741* | (2013.01) |
| *H04L 12/701* | (2013.01) |
| *H04L 12/725* | (2013.01) |

(52) U.S. Cl.
CPC ............... *H04L 45/54* (2013.01); *H04L 45/00* (2013.01); *H04L 45/302* (2013.01)
USPC ................. 370/392; 370/395.21; 370/395.31; 370/395.63; 370/409

(58) Field of Classification Search
None
See application file for complete search history.

(56) References Cited

U.S. PATENT DOCUMENTS

| | | | |
|---|---|---|---|
| 5,129,093 A | 7/1992 | Muramatsu et al. | |
| 5,181,017 A | 1/1993 | Frey, Jr. et al. | |
| 5,940,372 A | 8/1999 | Bertin et al. | |
| 6,275,845 B1 | 8/2001 | Tamura | |
| 6,295,597 B1 | 9/2001 | Resnick et al. | |
| 6,563,798 B1 | 5/2003 | Cheng | |
| 6,563,832 B1 | 5/2003 | Stuart et al. | |
| 6,590,867 B1 | 7/2003 | Ash et al. | |
| 6,775,284 B1 | 8/2004 | Calvignac et al. | |
| 7,251,218 B2 | 7/2007 | Jorgensen | |
| 2004/0078493 A1 | 4/2004 | Blumrich et al. | |
| 2004/0258069 A1* | 12/2004 | Serbest et al. | 370/395.1 |
| 2005/0018605 A1* | 1/2005 | Foote et al. | 370/230 |
| 2007/0297401 A1 | 12/2007 | Bosch et al. | |
| 2009/0086644 A1* | 4/2009 | Kompella et al. | 370/248 |

OTHER PUBLICATIONS

Overview of the Token Ring Switching;.
MPI: A Message Passing Interface;.

(Continued)

*Primary Examiner* — Faruk Hamza
*Assistant Examiner* — Thinh Tran
(74) *Attorney, Agent, or Firm* — Scully, Scott, Murphy & Presser PC; Daniel P. Morris, Esq.

(57) ABSTRACT

Disclosed are a unified method and apparatus to classify, route, and process injected data packets into a network so as to belong to a plurality of logical networks, each implementing a specific flow of data on top of a common physical network. The method allows to locally identify collectives of packets for local processing, such as the computation of the sum, difference, maximum, minimum, or other logical operations among the identified packet collective. Packets are injected together with a class-attribute and an opcode attribute. Network routers, employing the described method, use the packet attributes to look-up the class-specific route information from a local route table, which contains the local incoming and outgoing directions as part of the specifically implemented global data flow of the particular virtual network.

19 Claims, 2 Drawing Sheets

(56) References Cited

OTHER PUBLICATIONS

Dedicated Token Ring Concentrator MIB.
An Architecture for Differentiated Services;.
Class of Service in 802.1.
Upgrading and Reporting Networks;.
William J. Daily, "Virtual-Channel Flow Control", IEEE Transactions on Parallel and Distributed Systems, vol. 3, No. 2, Mar. 1992; pp. 194-205.
Allan Gottlieb, et al., The NYU Ultracomputer—Designing a MIMD, Shared-Memory Parallel Machines (Extended Abstract), IEEE, 1982; pp. 239-254.
G. F. Pfister, et al., "The IBM Research Parallel Processor Prototype (RP3): Introduction and Architecture", IEEE, 1985; pp. 764-771.
Steven L. Scott, "Synchronization and Communication in the T3E Multiprocessor", ASPLOS-VII, Cambridge, MA, Oct. 2-4, 1996; pp. 1-11.
Charles E. Leiserson, et al., "The Network Architecture of the Connection Machine CM-5", Thinking Machines Corporation, Cambridge MA, Mar. 21, 1994; pp. 1-16.
Paul F. Reynolds, Jr., et al., "Making Parallel Simulations Go Fast", Proceedings of the 1992 Winter Simulation Conference; pp. 646-656.
George Almasi, et al., "An Overview of the Blue Gene/L System Software Organization".
Chung-Sheng Li, et al., IEEE Journal on Selected Areas in Communications, vol. 14, No. 2, Feb. 1996; pp. 306-316.
Sheau-Ru Tong, et al., "A Multi-Stage Interconnection Network With Packet Diverting and Limited Combining Capabilities", Jan. 11, 1993; pp. 1-38.

G. Andrew Boughton, "Arctic Routing Clip", Laboratory for Computer Science, Computation Structures Group Memo 373, Mar. 7, 1994.
Christopher F. Joerg, et al., "The Monsoon Interconnection Network", Laboratory for Computer Science, Computation Structures Group Memo 340, Jan. 1991; pp. 1-4.
Mike Barnett, et al., "Building a High-Performance Collective Communication Library".
Vijay Karamcheti, et al., "Do Faster Routers Imply Faster Communication?", In Proceedings of Parallel Computer Routing and Communications Workshop, Seattle, Washington, May 16-18, 1994.
Philip K. McKinley, et al., "Unicast-Based Multicast Communication in Wormhole-Routed Networks", IEEE Transactions on Parallel and Distributed Systems, Jan. 1992; pp. 1-31.
George Almási, et al., "MPI on BlueGene/L: Designing an Efficient General Purpose Messaging Solution for a Large Cellular System", IBM Research Report, RC22851, Jul. 22, 2003, Computer Science; pp. 1-10.
James T. Kuehn, et al., "The Horizon Supercomputing System: Architecture and Software", IEEE, 1988; pp. 28-34.
Jack J. Dongarra, et al., A Message Passing Standard for MPP and Workstations, Communications of the ACM, vol. 39, No. 7, Jul. 1996; pp. 84-90.
Melanie L. Fulgham, et al., "Triplex: A Multi-class Routing Algorithm", pp. 127-138; and.
Paul F. Reynolds, et al., "Making Parallel Simulations Go Fast", Computer Science Report No. CS-92-21, Jun. 17, 1992; pp. 1-18.

\* cited by examiner

FIG. 4
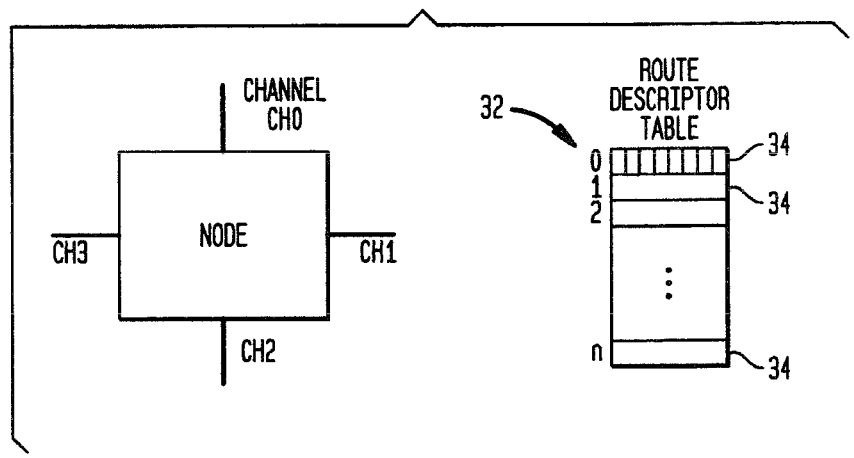
FIG. 5
|  | | CH3 | CH2 | CH1 | CH0 | LCL | CH3 | CH2 | CH1 | CH0 | LCL |
|---|---|---|---|---|---|---|---|---|---|---|---|
| NODE A | 0: | 0 | 1 | 1 | 0 | 1 | 0 | 0 | 0 | 1 | 0 |
|  | 1: | | | | | | | | | | |
| NODE B | 0: | 0 | 0 | 0 | 0 | 1 | 0 | 0 | 0 | 1 | 0 |
|  | 1: | | | | | | | | | | |
FIG. 6
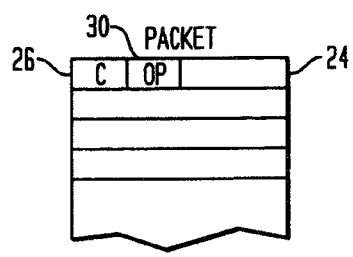

COLLECTIVE NETWORK ROUTING

CROSS REFERENCE TO RELATED APPLICATIONS

This application is a continuation of co-pending application Ser. No. 11/100,207, filed Apr. 6, 2005, for "Collective Network Routing", the disclosure of which is herein incorporated by reference in its entirety, which claims the benefit of Provisional Application No. 60/625,026, for "Collective Network Routing," filed Nov. 4, 2004.

GOVERNMENT CONTRACT

This invention was made with Government support under Subcontract B517552 under prime contract W-7405-ENG-48 awarded by The Department of Energy. The Government has certain rights in this invention.

BACKGROUND OF THE INVENTION

1. Field of the Invention

This invention generally relates to the field of high-speed digital data processing systems; and more specifically, the invention relates to methods and systems for routing messages in computer systems.

2. Background Art

Massively parallel computer systems comprise a large number of data processing elements, which are typically connected using a network. Each node connected to the said network typically is comprised of a network interface and the local data processing elements. The network interface receives data from the network, which is addressed to this particular node, and the network interface also injects the local results into the network. Data is typically routed through the network in packets; and the packets are routed by a plurality of routers, typically one router per node. The network, specifically the plurality of the network routers, ensures the movement of the injected packets between the connected nodes towards the desired packet destinations.

Typically, the node, which produces a data packet, specifies the desire destination of that packet by specifically providing a unique address of the said packet destination. Upon injection of such an attributed packet, the plurality of network routers make local routing decisions to incrementally reduce the distance of the packet to its destination by forwarding the packet to a connected node closer to the specified destination. This universal point-to-point style of communication is state of the art and used by most of today's implemented computer networks. The drawback of using addresses as part of the packet attributes is the limitation of the network scalability to the maximal number of addresses presentable with the bits dedicated to the packet address.

Furthermore, additional auxiliary networks have been used to implement special support for collective communication such as global broadcasts to all connected nodes (CM-5). These networks have typically the topology of a tree or a fat tree, since the tree topology provides the minimal distance between any two connected nodes and, thus, minimal communication latency.

There are several constraints imposed to particular nodes by the tree topology. For example, the dedicated root node splits the network into two domains, left and right. Traffic from one domain targeted to the other domain must go through the root node under any circumstances. A broken root-node, router and/or links, will render the entire network useless since no packets can be routed from the left to the right partition. In addition, leaf nodes in a tree network have only one connection to the network. If this link is broken, the entire network is also not functional anymore.

SUMMARY OF THE INVENTION

An object of this invention is to provide an improved method and system for routing data packets through multi-node computer networks.

Another object of the invention is to avoid using addresses to route data packets through computer networks by classifying the packets into a limited set of classes for which the packet behavior can be specified in detail on a per-node basis.

A further object of the present invention is to allow the nodes of a multi-node computer network to utilize an arbitrary number of links between nodes while still assuring deterministic packet routes through the network and thus allow for well-defined, well-behaving collective operations.

Another object of this invention is to route data packets through a multi-node computer network by employing a general address-less static routing method applicable to arbitrary network topologies, which allows to embed a plurality of virtual logical networks in one physical network.

A further object of the invention is to enable a multi-node computer system to define and process collective packet operations such as global packet reductions (global maximum or similar) on networks of arbitrary size and shape.

These and other objectives are attained with a method of and a system for routing data packets in a computer network having a multitude of nodes and a multitude of links connecting the nodes together, and wherein each data packet includes a class identifier. The method comprises the steps of, each node, for each of a defined set of data packets, checking or looking at the data packet to identify the class of the data packet, and routing the data packet from the node based on the identified class of the data packet.

The preferred embodiment of the invention, described in detail below, provides a method and apparatus for identifying collectives of packets among a plurality of packets on a network in a system of connected data processing elements which are connected using an arbitrary network topology. The preferred method yields local routing decisions as well as decisions whether collective packet reduction operations or other operations should be applied to the identified packet collective. The local result of the said collective packet operation is routed to the collective of connected nodes and/or locally received. The preferred embodiment of the invention allows the specification of packet data reductions among an arbitrary set of nodes, connected using an arbitrary interconnection topology. In addition to packet reductions, the invention also can be utilized to multi-/broadcast packets among one or more configurable sets of nodes in a network.

The preferred embodiment of the invention provides a number of important advantages. For instance, the invention avoids using addresses—and thus avoids their associated limitations—by classifying packets into a limited set of classes for which the packet behavior can be specified in detail on a per-node basis using, for example, local class descriptor tables. Each class may have a virtually unlimited set of nodes participating.

In addition, this preferred embodiment allows nodes to utilize an arbitrary number of links between nodes while still assuring deterministic packet routes through the network and, thus, allows for well-defined, well-behaving collective operations. Since the effective topology is defined per packet class, the topology may be modified dynamically, for example to compensate for broken links or to extend or shrink the affected network partition. Changes of the logical network topology may also be transparent to the application.

Further, the preferred embodiment of the invention disclosed herein solves several problems of auxiliary networks by employing a general address-less static routing method applicable to arbitrary network topologies, which allows to embed a plurality of virtual logical networks in one physical network; for example tree networks with redundant links or irregular networks. The absence of source or target addresses allows the application of this invention to networks of any size and shape.

In addition, the invention, in its preferred embodiment, allows to define and process collective packet operations such as global packet reductions (global sum or global maximum or similar) on networks of arbitrary size and shape.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 shows a route descriptor table comprising n route descriptors describing the packet behavior for a node with four network links plus one local client.

FIG. 5 shows one exemplary route descriptor configuration for class 0 of the two nodes A and B of the network shown in FIG. 3.

FIG. 6 illustrates a data packet that may be used in the practice of this invention.

DETAILED DESCRIPTION OF THE PREFERRED EMBODIMENTS

Figure 1:
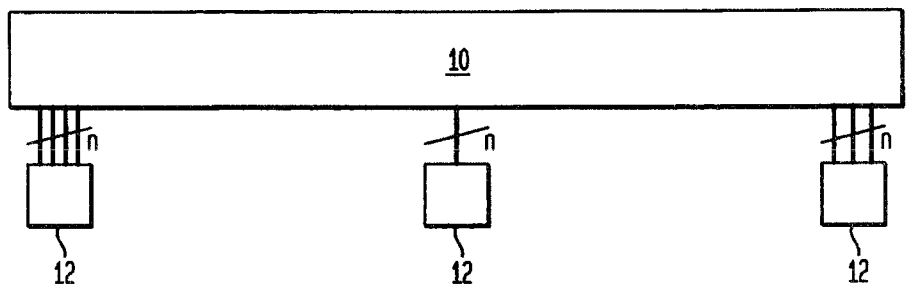
FIG. 1 shows the general architecture of a network comprising a plurality of nodes connected by an interconnection network of the degree n.

The herein described invention solves the problem to describe packet routes of single packets and to define packet collectives for collective packet operations among a plurality of nodes connected by a network with arbitrary topology of degree n as shown at 10 in FIG. 1. Each node 12 itself comprises the network interface and the local client, which contains the processing elements for data processing of the received data and for injecting results of the local computation into the network.

Figure 2:
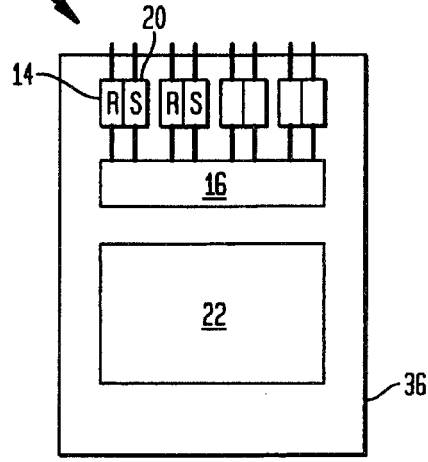
FIG. 2 describes the general structure of a single node of the network of FIG. 1.

The general structure of the network interface with four links, for a network of degree four, is also shown in FIG. 2. Each network link comprises a network receiver 14, which receives packets from the network link and presents the packets to the arbiter 16, which routes the packets, via sender 20, towards the targets specified using the collective class routing method herein described. The network interface also includes a local client CPU and memory, represented at 22.

In particular, the arbiter 16 first evaluates the packet header information, shown at 24 in FIG. 6, such as the class 26 of the packet and the specified packet opcode 30. Using the class information, the arbiter 16 retrieves the appropriate route descriptor from the route descriptor table, shown at 32 in FIG. 4. The route descriptor table can be read and written and contains the specific description 34 of the packet behavior for all available packet classes for this particular node. The route descriptor table may be different for each node in the network, depending on the position of the node in the logical network structure and on the availability of physical connections to neighboring nodes.

The route descriptor table 32 may be initialized immediately after booting the local client. During runtime, packet classes may be allocated and initialized to implement a specific communication pattern such as packet broadcast or a packet reduction. From that time on, packets, injected with the appropriate class-tag, follow the configured packet routes according to the route descriptors deposited in the nodes along the packet path through the network. For collective packet operations such as reductions, the route descriptor 34 also indicates which packets are members of the collective. The router 36 will wait until the packet collective is complete and it will then forward the packet collective while applying the specified packet operation.

The collective is considered to be complete if all channels which are identified as source-channels have collective packets available. Whether a packet is considered a collective packet or not is specified on a per-packet basis using the packet opcode field 30 of the packet header 22, shown in FIG. 6.

For the configuration shown in FIG. 5, for example, Node A considers a packet collective as complete if the receivers of channel 2, channel 1, and the local client signal the availability of a packet, which is marked with an opcode such as ADD or MAX, which in turn indicates a collective operation. In that case, the router applies the specified operation to the packet collective and routes the result of that operation to the sender of channel 0.

Packets, not marked as operands of collective packet operations, are simply routed to the target channels without waiting for the other sources. In general the rule for forwarding packets is: if the packet enters the node from a channel which is marked as a source channel for the given packet class, then the packet or the packet collective is routed to the specified target channels of that class. If the channel is not an explicit source channel, then the packet is routed to all the source channels and no collective operation is applied even though the packet opcode may request a collective operation.

The apparatus enabling the method of collective class routing, the route descriptor table 32, is an array of registers, which can be read and written, comprising at least two bits per potential packet route (channel). One bit indicates whether the particular channel is a dedicated source channel for that packet class. The other bit is set for all channels which are dedicated targets for packets of the given class. Thus the descriptor describes the packet routes and the packet collective for collective operations.

Figure 3:
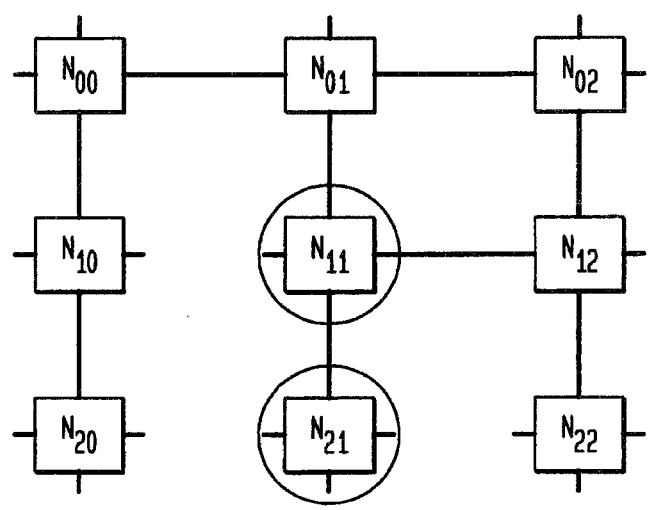
FIG. 3 depicts a sparsely connected network topology, suitable for the invention described herein.

With reference to FIG. 6, each packet header comprises the packet class 26 and the packet opcode 30. The class is used to identify the appropriate packet routes, and the opcode is used to decide whether collective operations should be applied. FIG. 5 shows an example of a particular configuration for class 0 of the two nodes A and B of the network shown in FIG. 3. It should be noted that a number of configurations may coexist in parallel, each using a different class with different sources and targets specified.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of routing data packets in a computer network having a multitude of nodes and a multitude of links connecting the nodes together, each data packet including a class identifier identifying the data packet as belonging to one of a plurality of packet classes, the method comprising:

embedding a plurality of configurable virtual logical networks in the computer network, each of the virtual logical networks being formed by a configurable set of the nodes of the computer network, and each of the packet classes being associated with one of said virtual logical networks;

each node, for each of a defined set of data packets, looking at the data packet to identify the class of the data packet from the class identifier of the data packet; and routing the data packet from the node based on the identified class of the data packet; and wherein an identified collective of the data packets is processed to compute a number of resulting data packets based on data of the identified collective of packets without reducing the number of data packets routed through the network;

wherein each node includes a route descriptor table including one or more route descriptors, each of the one or more route descriptors specifying one or more routes from said each node to one or more other nodes, and wherein each of the plurality of packet classes is associated with one of the one or more route descriptors, and wherein the routing step includes the steps of, each node, for each of the defined set of data packets, identifying the one of the route descriptors, in the route descriptor table of said each node, associated with the class of said each data packet; and routing the data packet from said each node to one or more of the other nodes on the one or more routes specified by the route descriptor with which the class of said each data packet is associated; and wherein to route the data packet through the one of the virtual logical networks associated with the one of the packet classes to which the data packet belongs; and changing the configuration of one of the configurable virtual logical networks by changing which ones of the nodes are in the configurable set of the nodes forming said one or more of the configurable virtual logical networks by changing one or more of the route descriptors of one or more of the route descriptor tables; and wherein:

each node includes one or more channels, each of the channels for sending the data packets from said each node to a respective one of the other nodes;

each route descriptor, of the route descriptor table of said each node, identifies one or more of said channels for routing the data packets, of the packet class associated with said each route descriptor, from said each node to one or more of the other nodes;

the route descriptor of each node includes two bits associated with each of the channels of said each node;

for each route descriptor of each node, a first of the two bits of the route descriptor indicates whether the channel associated with said first bit is a source channel for the packet class associated with said each route descriptor, and a second of the two bits of the route descriptor indicates whether the channel associated with said second bit is a target channel for data packets belonging to the packet class associated with said each route descriptor; and for each of the nodes:

if one of the data packets enters said each node from one of the channels of the node that is indicated as a source channel by the route descriptor associated with the packet class to which said one of the data packets belongs, then routing said one of the data packets to the channels of the node indicated as target channels by the route descriptor associated with the packet class to which said one of the data packets belongs; and if one of the data packets enters said each node from one of the channels of the node that is not indicated as a source channel by the route descriptor associated with the packet class to which said one of the data packets belongs, then routing said one of the data packets to all the channels of the node indicated as source channels by the route descriptor associated with the packet class to which said one of the data packets belongs.

2. A method according to claim 1, wherein at each node, the defined set of data packets includes data packets received at the node and data packets originated at the node.

3. A method as specified in claim 1, wherein an opcode associated with each packet or packet class indicates that the plurality of selected, specified input directions defines a local collective of packets which is subject to the said collective packet operation.

4. A method as specified in claim 3, wherein the identified collective of packets is subject to arithmetical/logical data processing operations to compute said number of resulting data packets.

5. An apparatus for routing data packets in a computer network having a multitude of nodes and a multitude of links connecting the nodes together, each data packet including a class identifier identifying the data packet as belonging to one of a plurality of packet classes, the apparatus comprising:

a plurality of checking means, each of the checking means being located at a respective one of the nodes for checking each of a defined set of data packets, to identify the class of the data packet from the class identifier of the data packet; and a plurality of routing means, each of the routing means being located at a respective one of the nodes to route data packets from said one node to another one of the nodes based on the class of the data packets; and wherein an identified collective of the data packets is processed to compute a number of resulting data packets based on data of the identified collective of packets without reducing the number of data packets routed through the network;

wherein a plurality of configurable virtual logical networks are embedded in the computer network, each of the virtual logical networks being formed by a configurable set of the nodes of the computer network, and each of the packet classes is associated with one of said virtual logical networks;

wherein each node includes a route descriptor table including one or more route descriptors, each route descriptor specifying one or more routes from said each node to one or more of the other nodes, and wherein each of the plurality of packet classes is associated with one of the route descriptors, and wherein the data packets are routed from said one node to one or more of the other nodes by:

each node, for each of the defined set of data packets, identifying the one of the route descriptors, in the route descriptor table of said each node, associated with the class of said each data packet; and routing the data packet from said each node to one or more of the other nodes on the one or more routes specified by the route descriptor with which the class of said each data packet is associated to route the data packet through the one of the virtual logical networks associated with the one of the packet classes to which the data packet belongs; and wherein:

the configuration of one or more of the configurable virtual logical networks is changed by changing which ones of the nodes are in the configurable set of the nodes forming said one or more of the configurable virtual logical networks by changing one or more of the route descriptors of one or more of the route descriptor tables;

each node includes one or more channels, each of the channels for sending the data packets from said each node to a respective one of the other nodes;

each route descriptor, of the route descriptor table of said each node, identifies one or more of said channels for routing the data packets, of the packet class associated with said each route descriptor, from said each node to one or more of the other nodes;

the route descriptor of each node includes two bits associated with each of the channels of said each node;

for each route descriptor of each node, a first of the two bits of the route descriptor indicates whether the channel associated with said first bit is a source channel for the packet class associated with said each route descriptor, and a second of the two bits of the route descriptor indicates whether the channel associated with said second bit is a target channel for data packets belonging to the packet class associated with said each route descriptor; and for each of the nodes:

if one of the data packets enters said each node from one of the channels of the node that is indicated as a source channel by the route descriptor associated with the packet class to which said one of the data packets belongs, then routing said one of the data packets to the channels of the node indicated as target channels by the route descriptor associated with the packet class to which said one of the data packets belongs; and if one of the data packets enters said each node from one of the channels of the node that is not indicated as a source channel by the route descriptor associated with the packet class to which said one of the data packets belongs, then routing said one of the data packets to all the channels of the node indicated as source channels by the route descriptor associated with the packet class to which said one of the data packets belongs.

6. Apparatus according to claim 5, wherein, at each node, the defined set of data packets includes data packets received at the node and data packets originated at the node.

7. A method as specified in claim 5, wherein an opcode associated with each packet or packet class indicates that the plurality of selected, specified input directions defines a local collective of packets which is subject to the said collective packet operation.

8. A method as specified in claim 5, wherein in addition to packet routes also specifies a plurality of nodes on the network which participate in a particular collective operation, comprising two additional bits per local route descriptor; one bit corresponding to the local contribution of the actual node to the said collective operation and another bit correlating to the local reception of the results of the said operation.

9. The method specified in claim 8, wherein the packet class and opcode information is also subject to a collective operation such as but not limited to substituting the class or opcode with certain predefined values or increment/decrement operations.

10. The method specified in claim 9, wherein the packet class and/or opcode information is being utilized to apply pre-processing steps, such as reverting the word order, to the data locally injected and/or to apply post-processing steps to the said data.

11. A program storage device readable by machine, tangibly embodying a program of instructions executable by the machine to perform method steps for routing data packets in a computer network having a multitude of nodes and a multitude of links connecting the nodes together, each data packet including a class identifier identifying the data packet as belonging to one of a plurality of packet classes, said method steps comprising:

embedding a plurality of configurable virtual logical networks in the computer network, each of the virtual logical networks being formed by a configurable set of the nodes of the computer network, and each of the packet classes being associated with one of said virtual logical networks;

each node, for each of a defined set of data packets, looking at the data packet to identify the class of the data packet from the class identifier of the data packet; and routing the data packet from said each node to another one of the nodes based on the identified class of the data packet; and wherein an identified collective of the data packets is processed to compute a number of resulting data packets based on data of the identified collective of packets without reducing the number of data packets routed through the network;

wherein each node includes a route descriptor table including one or more route descriptors, each route descriptor specifying one or more routes from said each node to one or more of the other nodes, and wherein each of the plurality of packet classes is associated with one of the route descriptors, and wherein the routing step includes the steps of, each node, for each of the defined set of data packets, identifying the one of the route descriptors, in the route descriptor table of said each node, associated with the class of said each data packet; and routing the data packet from said each node to or more one of the other nodes on the one or more routes specified by the route descriptor with which the class of said each data packet is associated to route the data packet through the one of the virtual logical networks associated with the one of the packet classes to which the data packet belongs; and changing the configuration of one or more of the configurable virtual logical networks by changing which ones of the nodes are in the configurable set of the nodes forming said one or more of the configurable virtual logical networks by changing one or more of the route descriptors of one or more of the route descriptor tables; and wherein:

each node includes one or more channels, each of the channels for sending the data packets from said each node to a respective one of the other nodes;

each route descriptor, of the route descriptor table of said each node, identifies one or more of said channels for routing the data packets, of the packet class associated with said each route descriptor, from said each node to one or more of the other nodes;

the route descriptor of each node includes two bits associated with each of the channels of said each node;

for each route descriptor of each node, a first of the two bits of the route descriptor indicates whether the channel associated with said first bit is a source channel for the packet class associated with said each route descriptor, and a second of the two bits of the route descriptor indicates whether the channel associated with said second bit is a target channel for data packets belonging to the packet class associated with said each route descriptor; and for each of the nodes:
if one of the data packets enters said each node from one of the channels of the node that is indicated as a source channel by the route descriptor associated with the packet class to which said one of the data packets belongs, then routing said one of the data packets to the channels of the node indicated as target channels by the route descriptor associated with the packet class to which said one of the data packets belongs; and if one of the data packets enters said each node from one of the channels of the node that is not indicated as a source channel by the route descriptor associated with the packet class to which said one of the data packets belongs, then routing said one of the data packets to all the channels of the node indicated as source channels by the route descriptor associated with the packet class to which said one of the data packets belongs.

12. A program storage device according to claim 11, wherein at each node, the defined set of data packets includes data packets received at the node and data packets originated at the node.

13. A program storage device according to claim 11, wherein an opcode associated with each packet or packet class indicates that the plurality of selected, specified input directions defines a local collective of packets which is subject to the said collective packet operation.

14. A program storage device according to claim 13, wherein the identified collective of packets is subject to arithmetical/logical data processing operations to combine the members of the packet collective thereby reducing the number of packets to be routed through the network.

15. A method of identifying a collective of data packets on a computer system, the computer system including a multitude of interconnected processing nodes, and wherein a multitude of data packets are routed in the computer system, the method comprising the steps of:
allocating a class identifier to identify a given class of data packets;
providing each data packet in said given class with said class identifier identifying the data packet as belonging to one of a plurality of packet classes;
providing each of the nodes with a set of channels for receiving and holding data packets; and
each of at least some of the nodes,
i) identifying a subset of the set of channels of the node,
ii) evaluating the data packets at the node to identify the class of the data packet from the class identifier of the data packet, and
iii) identifying said collective as complete when all of the channels of said subset have a data packet of the given class; and
wherein an identified collective of the data packets is processed to compute a number of resulting data packets based on data of the identified collective of packets without reducing the number of data packets routed through the network;
wherein a plurality of configurable virtual logical networks are embedded in the computer network, each of the virtual logical networks being formed by a configurable set of the nodes of the computer network, and each of the packet classes is associated with one of said virtual logical networks;
wherein each of said at least some of the nodes includes a route descriptor table including one or more route descriptors, each the route descriptor specifying one or more routes for data packets from said node to one or more of the other nodes, and each of the plurality of packet classes is associated with one of the route descriptors, and further comprising the step of identifying the route descriptor, of the route descriptor table, associated with the class of the data packet to identify one or more routes for the collective of data packets from the node to one or more of the other nodes to route the data packet through the one or more of the virtual logical networks associated with the one of the packet classes to which the data packet belongs; and wherein:
the configuration of one or more of the configurable virtual logical networks is changed by changing which ones of the nodes are in the configurable set of the nodes forming said one or more of the configurable virtual logical networks by changing one or more of the route descriptors of one or more of the route descriptor tables;
each node includes one or more channels, each of the channels for sending the data packets from said each node to a respective one of the other nodes;
each route descriptor, of the route descriptor table of said each node, identifies one or more of said channels for routing the data packets, of the packet class associated with said each route descriptor, from said each node to one or more of the other nodes;
the route descriptor of each node includes two bits associated with each of the channels of said each node;
for each route descriptor of each node, a first of the two bits of the route descriptor indicates whether the channel associated with said first bit is a source channel for the packet class associated with said each route descriptor, and a second of the two bits of the route descriptor indicates whether the channel associated with said second bit is a target channel for data packets belonging to the packet class associated with said each route descriptor; and for each of the nodes:
if one of the data packets enters said each node from one of the channels of the node that is indicated as a source channel by the route descriptor associated with the packet class to which said one of the data packets belongs, then routing said one of the data packets to the channels of the node indicated as target channels by the route descriptor associated with the packet class to which said one of the data packets belongs; and if one of the data packets enters said each node from one of the channels of the node that is not indicated as a source channel by the route descriptor associated with the packet class to which said one of the data packets belongs, then routing said one of the data packets to all the channels of the node indicated as source channels by the route descriptor associated with the packet class to which said one of the data packets belongs.

16. A method according to claim 15, further comprising the step of initializing the plurality of local route descriptors to reflect the local flow of data for the desired global operation associated with that class by selectively enabling the desired input and output directions.

17. A method according to claim 16, further comprising the steps of:

using the class identifier of the incoming packets to select one of the local route descriptors; and using the selected route descriptor to determine the plurality of valid input and output directions.

18. A method according to claim 17, further comprising the step of comparing the incoming direction of the packet with the specified incoming directions of the packet class to determine whether the packet is to be routed to the specified output directions or to the specified input directions.

19. A method as specified in claim 18, wherein an opcode associated with each packet or packet class indicates that the plurality of selected, specified input directions defines a local collective of packets which is subject to the said collective packet operation.

* * * * *